United States Patent Office.

JOSEPH BRETT, OF GENEVA, OHIO.

Letters Patent No. 80,053, dated July 21, 1868.

IMPROVED MODE OF MULCHING STRAWBERRY-BEDS.

*The Schedule referred to in these Letters Patent and making part of the same.*

TO ALL WHOM IT MAY CONCERN:

Be it known that I, JOSEPH BRETT, of Geneva, in the county of Ashtabula, and State of Ohio, have invented a new and useful Improvement in the Mode of Mulching Strawberry-Beds; and I do hereby declare that the following is a full, clear, and exact description of the same.

The experience of horticulturists has shown the necessity of mulching strawberry-plants in order to protect them against the winter frosts, and to form a clean bed for the berries to lie upon, so that they may not be exposed to contact with the dirt.

Various substances have been used for this purpose, such as straw, tan-bark, shavings, &c., all more or less expensive, particularly in the neighborhood of large cities, where these plants are especially cultivated in large quantities.

My improvement consists in growing the mulch upon the ground in the fall, which falling, when winter-killed, will protect the plants during the winter, and serve as a covering for the earth during the spring.

For this purpose I prefer oats as the cheapest and the best, but other plants of analogous character may be used.

After the strawberries have been gathered, the beds should be thoroughly cultivated during the summer to prevent the growth of weeds, grass, &c., which would interfere with the proper development of the strawberry-plants.

About the first of September I sow the beds with a suitable seed, preferring, as I have said, oats, using about four bushels of oats to the acre for this purpose, to be sown broadcast over the bed, and cultivate, and rake or hoe them in, so that, taking root, they may grow vigorously during the fall months.

As the strawberry-plants will have ceased growing before the oats are high enough to cover them injuriously, they will not be affected by this treatment.

The frost will winter-kill the growing plants thus sown, and the stalks, falling upon the strawberry-plants, will cover and protect them during the winter, and, in the spring, furnish a clean covering for the ground, answering fully the requirements for the protection of the berries from the dirt.

I have said that I prefer oats for the purpose, but I do not limit my claim to this particular plant, as my invention is distinguished from all other known modes by the growth, upon the strawberry-bed, of the plant which is intended for use as a mulch.

What I claim as my invention, and desire to secure by Letters Patent, is—

The mode of mulching strawberry-beds by sowing thereon the seeds of plants, the stalks or blades of which are intended to serve as a mulch therefor, substantially as set forth.

In testimony whereof, I have signed my name to this specification in the presence of two subscribing witnesses.

JOSEPH BRETT.

Witnesses:
JEROME MURRAY,
DENNIS THORP.